Patented Aug. 5, 1924.

1,503,937

UNITED STATES PATENT OFFICE.

FRANK A. CANON, OF CRAFTON, PENNSYLVANIA, ASSIGNOR TO THE BARRETT COMPANY, A CORPORATION OF NEW JERSEY.

PROCESS FOR THE MANUFACTURE OF AROMATIC SULPHONIC ACIDS.

No Drawing. Application filed December 13, 1921. Serial No. 521,987.

*To all whom it may concern:*

Be it known that I, FRANK A. CANON, a citizen of the United States, residing at Crafton, in the county of Allegheny and State of Pennsylvania, have invented certain new and useful Improvements in Processes for the Manufacture of Aromatic Sulphonic Acids, of which the following is a specification.

Heretofore various methods have been employed for the production of the aromatic sulphonic acids, among which are the following: by adding the aromatic hydrocarbon to an excess of sulfuric acid or of sulfuric acid containing free sulfur trioxide; by passing the vapors of the hydrocarbon into sulfuric acid contained in a vessel and heated to the proper temperature; by bringing the vapors of the hydrocarbon into contact with sulfuric acid of proper strength at an appropriate temperature, and maintaining the strength of the acid by subjecting the reaction mixture to a degree of vacuum sufficient to remove the water formed; by passing the vapors of the hydrocarbon mixed with gaseous $SO_3$ through a chamber in which the mixture of gases are heated to an appropriate temperature; and by passing the vapors of the hydrocarbons up through a column in which is descending a stream of sulfuric acid under the proper conditions of temperature and rate of flow. The strength of the sulfuric acid may be maintained in this last mentioned method by the removal in the vapor phase of the water formed by the unreacted vapors of the hydrocarbon passing through the column.

According to the present invention, water is removed from the sulfuric acid in a novel and advantageous manner so that the reaction is carried to substantial completion, and also making it possible for the reaction to be more easily controlled and regulated.

For the purpose of this specification inert gas shall include any diluent gas or vapor or any mixture of diluent gas or vapors which in themselves do not substantially react chemically with the reacting agents or do not interfere with the sulfonating action of the sulfuric acid.

I have found that when vapors of the aromatic hydrocarbons are carried by a stream of inert gas in the proper ratio of inert gas to hydrocarbon in a direction countercurrent to a descending stream of sulfuric acid or through sulfuric acid contained in a suitable receptacle under the proper conditions of temperature, rate of flow and strength of acid, the hydrocarbon combines with the acid with the formation of water and sulfonic acids of the aromatic hydrocarbon charged. The inert gas, which preferably should be dry but may be saturated with water vapor at substantially atmospheric temperature, is, when heated, readily able to absorb water from heated sulfuric acid containing water.

With any particular strength of sulfuric acid and any particular inert gas of a given humidity, the weight of water vapor carried off by the inert gas is dependent mainly upon the weight of the inert gas and the temperature maintained in the system. The weight of water formed for any particular type or degree of sulfonation is directly proportional to the weight of hydrocarbon sulfonated.

Since I can by well known methods regulate the ratio by weight of inert gas to hydrocarbon vapor, it follows that I can at the same time regulate within close limits the ratio by weight of inert gas to water formed.

With all other conditions constant, if the weight of inert gas charged per unit of time is just sufficient to vaporize and carry the water formed per unit of time, then the strength of the residual sulfuric acid will remain constant, but if the weight of inert gas charged per unit of time is more than sufficient to vaporize and carry the water formed per unit of time, then the strength of the residual acid will increase. An increase in the strength of the residual sulfuric acid will decrease its vapor pressure until it is such that, for any given temperature and ratio of inert gas to hydrocarbon, the strength of the residual sulfuric acid will remain constant. By the use of a proper ratio by weight of inert gas to hydrocarbon, the temperature can be kept sufficiently low so that undesirable products are not formed to any great extent.

Thus my invention is an improvement on the known processes of sulfonation in that it affords a continuous and almost instantaneous removal of the water of reaction, and also in that it uses less sulfuric acid since the residual sulfuric acid can be kept at a more uniform and constant concentration, and also in that weaker sulfuric acid can be charged since it is possible in the operation of this process to increase the strength of the residual sulfuric acid, if desired. Substantially no recovery of hydrocarbon as such is made; therefore, this process is particularly applicable for the sulfonation of aromatic hydrocarbon contained in waste gases of other processes, such as the catalytic oxidation of hydrocarbons, thus effecting a material saving since these hydrocarbons must otherwise be lost or recovered by other processes in a less valuable form.

I shall illustrate my invention by describing the process for the manufacture of benzene sulphonic acid from waste converter gases containing about 30 parts of inert gas to 1 part of $C_6H_6$ by weight. It is obvious, however, that without departing from the spirit and scope of my invention, I may use other ratios of inert gas to benzene or other hydrocarbons at various temperatures, with other strengths of sulfuric acid and in columns of various kinds, shapes and sizes, or in a series of tanks arranged so that the tanks can be moved progressively forward in the series countercurrent to the gas flow, or in fact I may employ a single tank containing the sulfonating agent.

*Example 1.*—Sulfuric acid of specific gravity 1.84 maintained at a temperature of 180° C., is caused to descend from plate to plate in a cap and bell column. A stream of inert gas containing about 30 parts of inert gas to 1 part $C_6H_6$ by weight is caused to pass up the tower where it comes into contact with the hot sulfuric acid with the formation of water and benzene sulphonic acids. The hot inert gases absorb the water of reaction and carry it as a vapor through an outlet near the top of the column into the atmosphere. The sulphonic acids, which will be found to be approximately 25% of benzene monosulphonic acid and 75% benzene disulphonic acid with a slight excess of sulfuric acid, are carried down by gravity to the base of the column where they are discharged through a trap into a suitable receptacle. With enough time of contact, substantially no benzene as such escapes at the top of the column.

*Example 2.*—Sulfuric acid of specific gravity 1.84 maintained at a temperature of 145° C., is contained within a tower provided with rings, grids, or other tower packing well known to chemists. A stream of inert gas, containing about 30 parts of inert gas to 1 part $C_6H_6$ by weight, is caused to bubble through the sulfuric acid with the formation of water and benezene sulphonic acids. The hot inert gases remove the water of reaction as a vapor through an outlet near the top of the tower into the atmosphere. The sulphonic acids, which will be found to be approximately 88% benzene monosulphonic acid and 12% benzene disulphonic acid, with a slight excess of sulfuric acid, are drawn either continuously or intermittently from the bottom of the tower into a suitable receptacle, fresh acid being admitted in like manner and corresponding amount at the top of the tower.

*Example 3.*—The tower system can also be replaced by a series of tanks containing the sulfuric acid held at any desired temperature, such as either temperature specified in the preceding examples. The mixture of inert gas and benzene is passed through these tanks containing the acid, and the number and size of tanks is chosen in accordance with the amount of benzene to be treated. When the concentration of sulphonic acid in the first tank reaches the desired point, it is removed from the series, discharged, charged with fresh acid, and added to the end of the series, each of the other tanks being accordingly moved forward one position.

If the sulfonation of the hydrocarbon takes place with ease, a single tank is often sufficient instead of tanks in series. When the desired reaction has finished in such a tank, it may be discharged and refilled with fresh acid, or fresh acid may be added continuously or in small intermittent amounts to this tank, provision being made for the removal of the sulfonated mixture in a similar manner.

I claim:

1. The process of producing sulphonic acids, which comprises passing vapors of an aromatic hydrocarbon and an inert gas into contact with sulfuric acid, said gas being capable of absorbing water.

2. The process of producing sulphonic acids, which comprises passing vapors of an aromatic hydrocarbon and an inert gas unsaturated with water vapor into contact with sulfuric acid.

3. The process of producing sulphonic acids, which comprises passing vapors of an aromatic hydrocarbon and an inert gas into contact with sulfuric acid, said gas being incapable of reacting with sulfuric acid.

4. The process of producing sulphonic acids, which comprises passing vapors of an aromatic hydrocarbon and waste converter gas into contact with sulfuric acid.

5. The process of producing sulphonic acids, which comprises passing vapors of an aromatic hydrocarbon and waste converter gas into contact with sulfuric acid in the proportions of about 1 to 30 by weight.

6. The process of producing sulphonic acids, which comprises passing vapors of an aromatic hydrocarbon and an inert gas into contact with sulfuric acid, said gas being capable of absorbing moisture at the temperature of reaction of sulfuric acid upon said hydrocarbon.

In testimony whereof I affix my signature.

FRANK A. CANON.